United States Patent [19]

Bayer et al.

[11] Patent Number: 4,962,436
[45] Date of Patent: Oct. 9, 1990

[54] RECORDING AND/OR REPRODUCING APPARATUS FOR A RECORD CARRIER IN THE FORM OF A TAPE

[75] Inventors: Ernst Bayer, Vienna; Karl Fischer, Perchtoldsdorf, both of Austria

[73] Assignee: U.S. Philips Corporation, New York, N.Y.

[21] Appl. No.: 324,354

[22] Filed: Mar. 15, 1989

[30] Foreign Application Priority Data

Jun. 14, 1988 [AT] Austria .................. 1544/88

[51] Int. Cl.$^5$ ...................... G11B 15/00; G11B 17/00
[52] U.S. Cl. .................................. 360/96.3; 360/93; 242/199
[58] Field of Search ............. 360/96.3, 96.5, 96.1, 360/90, 93, 137; 242/199

[56] References Cited

U.S. PATENT DOCUMENTS

| | | | |
|---|---|---|---|
| 4,511,941 | 4/1985 | Ida | 360/93 X |
| 4,547,823 | 10/1985 | Ri et al. | 360/90 X |
| 4,562,497 | 12/1985 | Morinaga et al. | 360/96.3 |
| 4,720,755 | 1/1988 | Kamijo | 360/96.3 |

*Primary Examiner*—John H. Wolff

[57] ABSTRACT

A recording and/or reproducing apparatus for a record carrier in the form of a tape which is accommodated in a cassette and which can be wound onto two reel hubs. The apparatus comprises two winding mandrils for driving the reel hubs and two winding mandril wheels which are coaxial with the winding mandrils and which are rotationally interlocked with the mandrils. A drive arrangement for driving the winding mandril wheels comprises a drive shaft, which is rotatably journalled on a bearing support which is movable transversely of the axes of the winding mandrils, and a drive wheel which is mounted on the drive shaft and which can be driven by a motor. The drive shaft comprises a first shaft section for driving one of the two winding mandril wheels, which shaft section is disposed at the same level as the winding mandril wheels and a second shaft section for driving the other one of the winding mandril wheels, which second shaft section is disposed at a level between the level of the winding mandril wheels and the level of the cassette main-side which is remote from the winding mandril wheels. The drive wheel is arranged adjacent the cassette, between the level of the winding mandril wheels and the level of the cassette main-side which is remote from the winding mandril wheels.

29 Claims, 4 Drawing Sheets

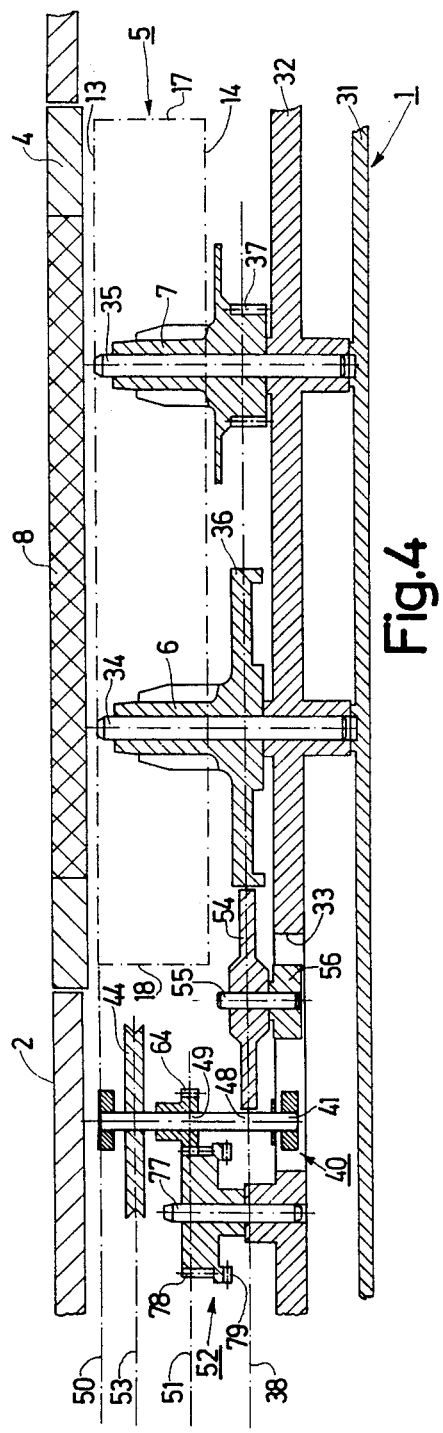
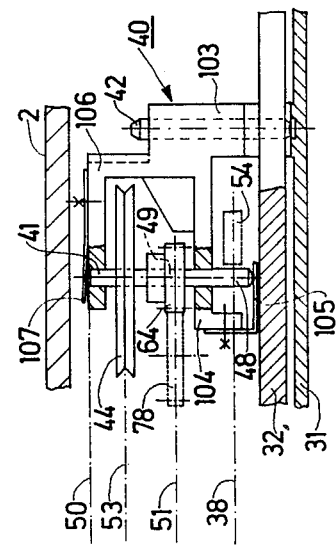
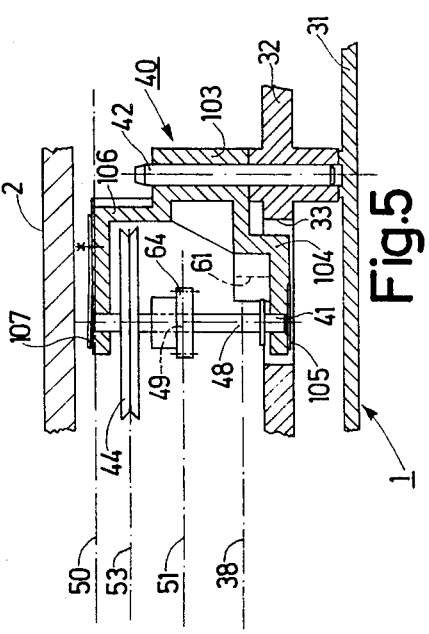

RECORDING AND/OR REPRODUCING APPARATUS FOR A RECORD CARRIER IN THE FORM OF A TAPE

BACKGROUND OF THE INVENTION

The invention relates to a recording and/or reproducing apparatus for a record carrier in the form of a tape accommodated in a cassette which can be loaded into the apparatus and which comprises two juxtaposed rotatable reel hubs for taking up the record carrier, the apparatus comprising a rotatable forward-winding mandril and a rotatable reverse-winding mandril, which winding mandrils each engage one of the two reel hubs to drive the record carrier when a cassette is present in the apparatus and are each rotationally interlocked with one of two winding mandril wheels which are coaxial with the two winding mandrils and which are both arranged at substantially the same axial level adjacent a cassette-main side which faces the winding mandril wheels and comprising a drive arrangement which is constructed to drive the two winding mandril wheels and which comprises a drive shaft which extends parallel to the axes of the winding mandrils and which is rotatably journalled on a bearing support which is movable transversely of the axes of the winding mandrils, which drive shaft carries a drive wheel which is rotatable by a motor, and which comprises a first shaft section and a second shaft section, the first shaft section being disposed at substantially the same level as the winding mandril wheels and the second shaft section being disposed at a level between the level of the winding mandril wheels and the level of the cassette main-side which is remote from the winding mandril wheels, and by means of which shaft sections one of the two winding mandril wheels is selectively drivable by moving the bearing support, a drive transmission being arranged between the second shaft section and the winding mandril wheel which can be driven by means of said shaft section, to bridge the difference between their levels.

A commercially available known apparatus of this type is used as a pocket dictation machine for a cassette containing a record carrier in the form of a magnetic tape, and during operation it is held in one hand by the user. There is a trend to minimise the dimensions of such apparatuses, in particular their overall height, i.e. their thickness, and also their width, so that they can be put easily into and carried about conveniently in a pocket of a jacket or the like. The known apparatus is constructed to accept a cassette with its longitudinal direction oriented transversely of the longitudinal direction of the apparatus and comprises a movable bearing support which together with the drive shaft, which is rotatably journalled on said support and which extends parallel to the axes of the winding mandrils, is arranged in the proximity of the long and narrow cassette side which is remote from the magnetic head for scanning the magnetic tape. The drive wheel on the drive shaft is disposed at an axial level which, in the direction from the cassette main-side facing the winding mandril wheels towards these wheels, is situated at a greater distance from the level of this cassette main-side than from the level of the winding mandril wheels. This means that in a plan view of the apparatus the drive wheel, in relation to the cassette and the winding mandril wheels, is situated underneath the winding mandril wheels. As a result of this arrangement of the drive wheel the space required for this wheel inside the apparatus underneath the winding mandril wheels, viewed in the axial direction of the winding mandrils of the apparatus, is such that this is in conflict with the requirement to minimise the dimensions of the apparatus in the axial direction of the winding mandrils, i.e. to provide an apparatus which is as flat as possible.

SUMMARY OF THE INVENTION

It is an object of the invention to meet the above requirement and to construct an apparatus of the type defined in the opening paragraph so as to minimise the dimensions of the apparatus in the axial direction of the winding mandrils. According to the invention this is achieved in that the drive wheel on the drive shaft is also disposed at a level between the level of the winding mandril wheels and the level of the cassette main-side which is remote from the winding mandril wheels. In this way it is achieved that the drive wheel is situated at a level in an area adjacent the cassette which otherwise would not be used, and that consequently said wheel does not occupy any space underneath the cassette and the winding mandril wheels, so that the apparatus dimension in the axial direction of the winding mandrils is dictated only by the thickness of the cassette and the overall height of the winding mandril wheels adjacent the cassette and can thus be minimised. In this way it is possible to realise a flat apparatus having a minimal overall height.

The drive wheel can be arranged on the drive shaft, for example between the first and the second shaft section. However, it is found to be advantageous if the level of the drive wheel on the drive shaft, viewed in the axial direction of the drive shaft, is situated at a larger distance from the level of the winding mandril wheels than the level of the second section of the drive shaft. In this way it is achieved that the drive wheel can be arranged as close as possible to the level of the cassette main-side which is remote from the winding mandril wheels, which is advantageous for an optimum freedom in choosing the overall height of the motor provided to drive the drive wheel.

The drive wheel may be arranged, for example, adjacent the cassette in the proximity of one of the long and narrow cassette sides. However, it is found to be advantageous if the drive wheel is situated adjacent the cassette in the proximity of one of the two short and narrow cassette sides. In this way it is achieved that in an apparatus which is constructed to accept a cassette with its longitudinal direction oriented parallel to the longitudinal direction of the apparatus, the dimension of the apparatus transverse of its longitudinal dimension can also be minimised, which has the advantage that an apparatus of minimal width can be realised.

In this respect it is also found to be very advantageous if the drive wheel is situated adjacent the cassette in the proximity of the short and narrow cassette side nearest the forward winding mandril. In this way the desired result is achieved by arranging between that section of the drive shaft which is arranged to drive the winding mandril wheel with which the forward-winding mandril is rotationally interlocked and said winding mandril wheel a drive transmission comprising a minimal number of parts, which is advantageous in view of minimal apparatus dimensions and a uniform and smooth drive of the forward-winding mandril.

For the power transmission from the drive shaft to the forward-winding spindle it is found to be advantageous if, in an apparatus in which the winding mandril wheel with which the forward-winding mandril is rotationally interlocked is constructed as a friction wheel and can be driven by the first section of the drive shaft, the friction wheel which is rotationally interlocked with the forward-winding mandril is arranged to be driven via a further friction wheel with which the first section of the drive shaft is engageable by moving the bearing support. In this way a very simple, robust and reliable drive is established between the first section of the drive shaft and the friction wheel which is rotationally interlocked with the forward-winding mandril, which in a forward mode again guarantees a substantially wobble-free drive of the forward-winding mandril and, consequently, of the record carrier in order to record and reproduce signals.

In this respect it is also found to be advantageous if an actuating spring for moving the bearing support is arranged in the proximity of said support to load the for support movement towards the further friction wheel and by means of which spring, via the bearing support, the first section of the drive shaft is engageable with the further friction wheel to drive said further friction wheel. In this way it is achieved that in the forward mode the actuating spring urges the first shaft section against the further friction wheel, resulting in an accurately defined spring-force-dependent pressure between the first shaft section and the further friction wheel and between the further friction wheel and the friction wheel which is rotationally interlocked with the forward-winding mandril, which ensures an adequate friction and at the same time a long life of the friction-wheel transmission.

In an apparatus, in which the drive wheel is situated adjacent the cassette in the proximity of the short and narrow cassette side nearest the forward-winding mandril, in which the winding mandril wheel which is rotationally interlocked with the reverse-winding mandril is constructed as a toothed wheel, and in which the second section of the drive shaft carries a spur wheel which by moving the bearing support is engageable with a drive mechanism via which the toothed wheel which is rotationally interlocked with the reverse-winding mandril can be driven, the drive mechanism comprising the drive transmission which bridges the difference between the level of the second shaft section and the level of the winding mandril wheels, it is found to be advantageous for the transmission of power from the drive shaft to the reverse-winding mandril, if via a first drive section of the drive mechanism, with which section the spur wheel is engageable by moving the bearing support and which constitutes the drive transmission which bridges the difference between the level of the spur wheel and the level of the winding mandril wheels, the spur wheel on the second shaft portion is arranged to drive a shaft transmission comprising a flexible portion, and disposed substantially at the same level as the winding mandril wheels which shaft transmission, via a second drive section of the drive mechanism, which drive section is situated substantially at the same level as the winding mandril wheels drive the toothed wheel which is rotationally interlocked with the reverse-winding mandril. This results in an efficient transmission between the second section of the drive shaft and the toothed wheel which is rotationally interlocked with the reverse-winding mandril, which has the advantage of an effective energy-saving drive of the reverse-winding mandril and hence of the record carrier during rewinding in a reverse mode, and which, moreover, occupies a minimal space, which concurs with the trend to minimize the dimensions of the apparatus.

For the construction of the shaft transmission it is found to be advantageous if the flexible portion of the shaft transmission is constituted by a helical spring having one of its ends attached to a first shaft driven by the first drive section and having its other end attached to a second shaft driving the second drive section. This enables the shaft transmission to be constructed very simply and economically by means of a standard helical spring.

The first drive section may be constructed, for example, by means of bevel wheels. However, it is found to be very advantageous if the first drive section comprises a further spur wheel, which is engageable with the spur wheel on the second shaft section by moving the bearing support, a crown wheel, which is coaxially connected to the further spur wheel, and whose teeth point towards the level of the winding mandril wheels, and a pinion, which meshes with the crown wheel and which is connected to the first shaft of the shaft transmission. Such a construction of the first drive section is advantageous because it is simple and can be manufactured cheaply.

For the second drive section it is found to be advantageous if the toothed wheel which is rotationally interlocked with the reverse-winding mandril is constructed as a worm wheel and the second drive section is constituted by a worm connected to the second shaft of the shaft transmission which worm together with the second shaft is rotatably supported by a further support which is movable transversely of the axes of the winding mandrils and which worm is engageable with the worm wheel by moving the further support. Using a minimal number of drive elements, this yields a very simple drive transmission between the second shaft and the toothed wheel which is rotationally interlocked with the reverse-winding mandril, whose axes extend at right angles to one another.

For moving the further support it is found to be advantageous if a further actuating spring for moving the further support is arranged in the proximity of said further support to load the further support for movement towards a stationary stop for said further support and by means of which spring via the further support, the worm is disengageable from the worm wheel which is rotationally interlocked with the reverse-winding mandril. Thus, the further actuating spring tends to disengage the worm from the worm wheel, thereby effectively preventing the worm from remaining inadvertently in mesh with the worm wheel.

For controlling the forward mode of operation and the reverse mode of operation of the record carrier, it is found to be advantageous if, for controlling the movement of the support for the shaft together with the worm and the movement of the bearing support for the drive shaft together with the drive wheel, there is provided a single control slide which is movable by hand between a forward operating position and a reverse operating position. In this way it is achieved that both the bearing support and the further support are moved by means of only one control slide, which is advantageous for a simple construction and accurately coordinated cycles of movement.

It is then found to be advantageous if the further actuating spring is constructed as a leg spring of which one leg acts against the further support and whose other leg acts against a latching member which is guided to be movable transversely of the direction of movement of the control slide and which under the influence of the further actuating spring at least in one of the operating positions of the control slide, engages in a latching recess formed in the control slide and corresponding to said operating position. This has the advantage that the further actuating spring for the further support performs an additional function, namely that of a latching spring for latching the control slide in at least one of its operating positions.

For controlling the movements of the bearing support and the further support the control slide may, for example, cooperate directly with said supports, However, it is found to be advantageous if in its reverse operating position the control slide via a first actuating portion of said slide, keeps the actuating spring provided for loading the bearing support in a position in which the bearing support is not loaded and, via a second actuating portion of said slide, keeps the further actuating spring provided for loading the further support in a position in which the worm is in mesh with the worm wheel, and in its forward operating position its first actuating portion and its second actuating portion are clear of the two actuating springs. In this way it is achieved that in its forward operating position the control slide does not cooperate with the bearing support and the further support and in its reverse operating position does not cooperate directly with said supports but by means of its two actuating portions via the two actuating springs, which has the advantage of a substantially tolerance-independent control of the movements of the bearing support and the further support by means of the control slide.

In its reverse operating position the control slide can keep the bearing support in such a position, for example via a further spring, that the spur wheel on the second section of the drive shaft is kept in mesh with the drive mechanism for driving the toothed wheel which is rotationally interlocked with the reverse-winding mandril. However, in an apparatus in which the drive wheel on the drive shaft is constructed as a pulley and in which a further pulley is mounted on the motor shaft of the motor, to drive the pulley via a belt, it is found to be very advantageous if the belt exerts a force on the movable bearing support via the pulley to cause the bearing support to bring the spur wheel on the second section of the drive shaft in mesh with the drive mechanism for driving the toothed wheel which is rotationally interlocked with the reverse-winding mandril. This has the advantage that the movement of the bearing support for bringing the spur wheel on the second section of the drive shaft in mesh with the drive mechanism for driving the toothed wheel which is rotationally interlocked with the reverse-winding mandril is obtained without any separate means using the belt which is present anyway. In this respect it is also found to be advantageous if for moving the bearing support said support is arranged on a pivotable actuating lever and during the movement of the bearing support to bring the spur wheel on the second section of the drive shaft in mesh with the drive mechanism for driving the toothed wheel which is rotationally interlocked with the reverse-winding mandril the pulley is moved away from the further pulley, causing the belt between the further pulley and the pulley to be tensioned additionally. This results in the belt tension and consequently the friction being higher in the reverse mode than in the forward mode of the record carrier transport which has the advantage of a reliable drive of the record carrier in the reverse mode and an energy-saving drive of the record carrier in the forward mode.

BRIEF DESCRIPTION OF THE DRAWINGS

Three embodiments of the invention will now be described in more detail, by way of example, with reference to the accompanying drawings.

FIG. 4 shows a part of the drive arrangement, shown in FIG. 3, for the two winding mandrils of the apparatus of FIG. 1 in a sectional view taken on the line IV—IV in FIG. 3 across a drive wheel of the drive arrangement, which drive wheel is rotatably journalled on a bearing support by means of a drive shaft, and across the two winding mandrils, the cassette being shown in dash-dot lines.

FIG. 5 is a sectional view taken on the line V—V in FIG. 3, showing the bearing support together with the drive wheel which is rotatably journalled on said support by means of the drive shaft of the apparatus shown in FIG. 1.

FIG. 6, similarly to FIG. 5, shows a bearing support for rotatably supporting a drive wheel of a drive arrangement for the winding mandrils of an apparatus in a second embodiment of the invention.

DESCRIPTION OF THE PREFERRED EMBODIMENTS

Figure 1:
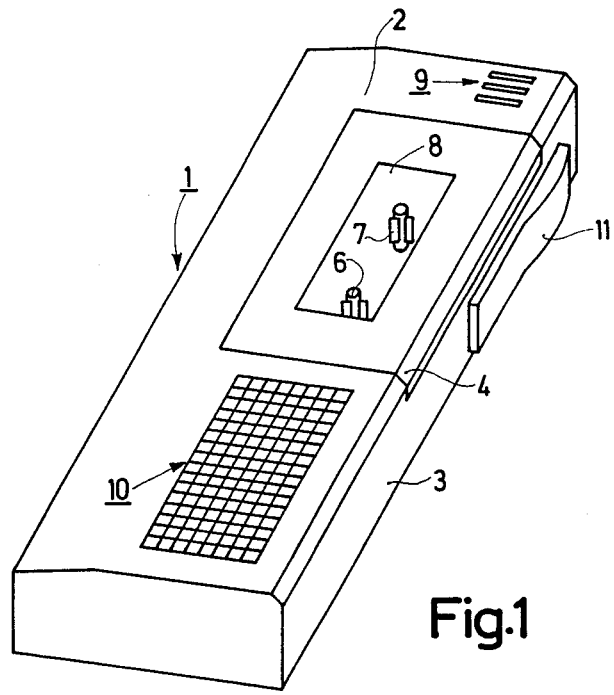
FIG. 1 is a substantially full-scale oblique view of a recording and reproducing apparatus constructed as a pocket dictation machine in accordance with a first embodiment of the invention, which is constructed to accept a cassette containing a record carrier in the form of a magnetic tape.
Figure 2:
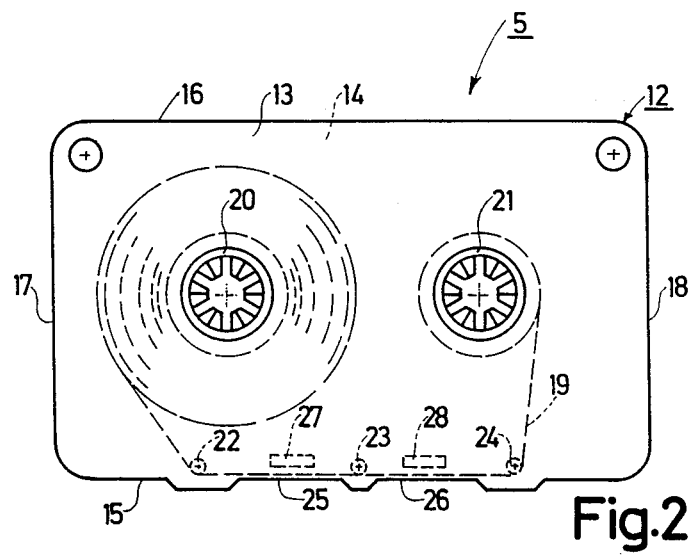
FIG. 2 is an enlarged-scale partly diagrammatic plan view of the cassette for the apparatus shown in FIG. 1.

FIG. 1 shows a recording and reproducing apparatus 1, constructed as a pocket dictation machine, for recording and reproducing speech signals. The apparatus 1 comprises a cover 4, which is pivotally attached to the upper side 2 of the apparatus and which extends up to a long and narrow side 3 of the apparatus visible in FIG. 1, for closing a cassette receptacle for a cassette 5, as shown in FIG. 2 containing a record carrier in the form of a magnetic tape, which cassette receptacle is constructed to receive the cassette with its longitudinal direction oriented parallel to the longitudinal direction of the apparatus 1. FIG. 1 illustrates a situation in which the cassette receptacle does not contain a cassette. A forward-winding mandril 6 and a reverse-winding mandril 7 project from the lower part of the apparatus into the cassette receptacle and are visible through a transparent window portion 8 of the cover 4. Further, the upper side 2 of the apparatus is formed with a row 9 of elongate sound-passage apertures behind which a built-in microphone 1 is arranged and a diagrammatically shown field 10 of sound-passage apertures behind which a built-in loudspeaker is arranged in the apparatus 1. At its long and narrow side 3 visible in FIG. 1 the apparatus 1 comprises a slide button 11, which is slidable in the longitudinal direction of this side of the apparatus to switch on the tape-transport modes of the apparatus. The slide button 11 can be set by hand to four operating positions which successively correspond to the tape-transport modes "fast reverse", "stop", "normal forward", and "fast forward".

The cassette 5 comprises a rectangular housing 12 having a first cassette main-side 13 visible in FIG. 2, a second cassette main-side 14, not visible in FIG. 2, a long and narrow cassette front-side 15, a long and narrow cassette rear-side 16, a short and narrow left-hand cassette side 17 shown in FIG. 2, and a short and narrow right-hand cassette side 18 shown in FIG. 2. The cassette 2 accommodates a record carrier in the form of a magnetic tape 19 for the storage of speech signals, two juxtaposed rotatable reel hubs 20 and 21 being rotatably mounted between the two cassette main-walls 13 and 14 to take up the magnetic tape 19. The magnetic tape 19 is attached to the reel hubs 20 and 21 at both ends and in the cassette shown in FIG. 2 it is wound completely onto the reel hub 20. The magnetic tape 19 extends from the roll on the reel hub 20 to the other reel hub 21 via three cylindrical tape guides 22, 23 and 24. By means of the tape guides 22, 23 and 24 the magnetic tape 19 is guided along the long and narrow cassette front-side 15 in which two apertures 25 and 26 are formed. Through the two apertures 25 and 26 two magnetic heads on the apparatus can be brought in scanning contact with the magnetic tape 19, the magnetic tape 19 being pressed against the head faces of the two magnetic heads by means of two pressure pads 27 and 28 which are movably supported in the cassette. The two magnetic heads comprise a magnetic recording and reproducing head for recording and reproducing speech signals on/from the magnetic tape 19 and a magnetic erase head for erasing the speech signals on the magnetic tape 19.

The cassette 5 can be inserted into the apparatus 1 in two mutually inverted positions, the winding mandrils 6 and 7 of the apparatus being engageable with the reel hubs 20 and 21 through one of the two cassette main walls 13 or 14 depending on the position of the cassette, so that when the apparatus contains a cassette each of the two winding mandrils 6 and 7 is coupled to one of the two reel hubs 20 and 21 to drive the magnetic tape 19. In the present apparatus 1 the magnetic tape 19 is driven by driving only one of the two winding mandrils 6 and 7 in all the tape-transport modes.

The part of the apparatus 1 shown in FIG. 1 which is relevant to the invention will now be described with reference to FIGS. 3 and 4. A mounting plate 32 is secured between two long side walls 29 and 30, of which the side wall 29 is situated at the long and narrow side 3 of the apparatus, and a bottom wall 31 of the apparatus housing, and has an offset portion adjacent each of the side walls 29 and 30 and an opening 33, whose function will be explained hereinafter. Two spindles 34 and 35 are locked against rotation in the mounting plate 32. The forward-winding mandril 6 is rotatably mounted on the spindle 34 and the reverse-winding mandril 7 is rotatably journalled on the spindle 35. Each of the two winding mandrils 6 and 7 is rotationally interlocked with one of two winding mandril wheels, which are coaxial with the two winding spindles. The winding mandril wheel 36, which is rotationally interlocked with the forward-winding mandril, is constructed as a friction wheel. The winding mandril wheel 37, which is rotationally interlocked with the reverse-winding mandril 7, is constructed as a worm wheel, which may be regarded as a special version of a toothed wheel. The two winding mandril wheels 36 and 37 are arranged adjacent the cassette main-side 14 facing the winding mandril wheels at substantially the same axial level 38, as is indicated by a dash-dot line in FIGS. 4 and 5.

The apparatus 1 comprises a drive arrangement 39 for driving the two winding mandril wheels 36 and 37. On a bearing support 40, which is movable transversely of the spindles 34 and 35 of the winding mandrils 6 and 7, the drive arrangement 39 comprises a rotatably journalled drive shaft 41, which extends parallel to the winding mandril spindles. The bearing support 40 is pivotable about a spindle 42, which is locked against rotation in the mounting plate 32 and whose portion which faces the bottom wall 31 is arranged at the same level as the mounting plate 32 and is situated in the opening 33 in the mounting plate 32, as can be seen in FIGS. 4 and 5. A drive wheel 44, constructed as a pulley, is mounted on the drive shaft 41 and can be rotated by a motor 43 which is secured to the mounting plate 33. The motor shaft 45 of the motor 43 carries a further pulley 46 to drive the pulley 44 via a belt 47.

The drive shaft 41 comprises a first shaft section 48 and a second shaft section 49, as can be seen in FIGS. 4 and 5. The first shaft section 48 of these two shaft sections 48 and 49 is disposed at the level 38 of the two winding mandril wheels 36 and 37. The second shaft section 49 is disposed at a level 51 between the level 38 of the winding mandril wheels 36 and 37 and the level 50 of the cassette main-side 30 which is remote from the winding mandril wheels 36 and 37. In FIGS. 4 and 5 the two levels 50 and 51 are each indicated by means of dash-dot lines. By moving the bearing support 40 one of the two winding mandril wheels 36 and 37 can be driven selectively by means of the two shaft sections 48 and 49. In the present apparatus 1 the winding mandril wheel 36 is arranged to be driven by the first shaft section 48 and the winding mandril wheel 37 is arranged to be driven by the second shaft section 49. A drive transmission 52 is provided between the second shaft section 49 and the winding mandril wheel 37 which can be driven by this shaft section to bridge the difference between their respective levels 51 and 38, as will be described in detail hereinafter.

As is indicated in dash-dot lines in FIGS. 4 and 5, the drive wheel 44 on the drive shaft 41 in the apparatus 1 is also disposed at a level 53 between the level 38 of the winding mandril wheels 36 and 37 and the level 50 of the cassette main-side 13 which is remote from the winding mandril wheels 36 and 37. Thus, the drive wheel 44 is accommodated within the overall height of the cassette 5, so that in the height direction of the cassette the drive wheel does not extend beyond the cassette, as a result of which the height between the upper side 2 of the apparatus and the mounting plate 32 is dictated mainly by the space needed for the cassette 5 and the space needed for the winding mandril wheels 36 and 37 and is consequently minimal. Since the overall height, i.e. the thickness, of the present apparatus consists of said minimal height between the upper side 2 of the apparatus and the mounting plate 32 plus the height of a space between the mounting plate 32 and the bottom wall 31 for accommodating a p.c. board together with the component mounted on, this overall height is also minimal. The drive wheel 44 is then arranged adjacent the cassette 5 in the proximity of the short and narrow cassette side 18 nearest the forward-winding mandril 6. Thus, the drive wheel 44 is situated within the width dimension of the cassette 5, so that in the width direction of the cassette the drive wheel does not extend beyond the cassette and consequently the dimension of the apparatus in this direction is in fact dictated only by the space needed for the cassette and can consequently be minimal. As a result of this arrangement of the drive wheel 44 the construction of the apparatus can be as flat and as narrow as possible, enabling the apparatus to be conveniently carried about in a pocket of a jacket and the like.

As can also be seen in FIGS. 4 and 5, the level 53 of the drive wheel 44 on the drive shaft 41 is situated at a larger distance from the level 38 of the winding mandril wheels 36 and 37 in the axial direction of the drive shaft 41 than the level 51 of the second shaft section 49 of the drive shaft 41. Thus, the drive wheel 44 is situated as close as possible to the level 50 of the cassette main-side 13 which is remote from the winding mandril wheels 36 and 37. As a result of this the drive wheel 44 and the further pulley 46 which is mounted, on the motor shaft 45 of the motor 43 and which is coupled to the drive wheel 44 via the belt 47, is arranged at a maximal distance from the bottom wall 31 and the mounting plate 32 respectively, so that a comparatively large space for the motor 43 is available, which has the advantage of greater freedom as regards the choice of the overall height of the motor.

As already stated, the winding mandril wheel 36 in the apparatus 1, which wheel is rotationally interlocked with the forward-winding mandril 6 and is constructed as a friction wheel, is arranged to be driven by the first shaft section 48 of the drive shaft 41. For this purpose a further friction wheel 54 is provided to drive the friction wheel 36 which is rotationally interlocked with the forward-winding mandril 6. The further friction wheel 54 is rotatably mounted on a stepped pivotable lever 56 by means of a spindle 55. The lever 56 is pivotable about a spindle 57 which is locked against rotation in the mounting plate 32 and its stepped portion carrying the spindle 55 is disposed at the level of the mounting plate 32 and is situated in the opening 33 in the mounting plate 32, as can be seen in FIG. 4. By moving the bearing support 40 the first shaft section 48 of the drive shaft 41 is engageable with the further friction wheel 54. The further friction wheel 54 provides a very simple, stable and reliable drive transmission between the drive shaft 41 and the friction wheel 36 which is rotationally interlocked with the forward-winding mandril 6, ensuring a uniform and wobble-free drive for the magnetic tape 19 in the cassette 5 in the "normal forward" mode.

An actuating spring 58 is arranged near the bearing support 40 to urge the bearing support 40 towards the further friction wheel 54. The actuating spring 58 is constructed as a leg spring, whose wound central portion is slid onto a pin 59 which projects from the mounting plate 32. A first leg 60 of the actuating spring 58 comprises two angular portions and bears against a projection 61 on the support 40 to load the bearing support 40. A second leg 62 of the actuating spring 58 bears against a stationary stop 63 on the mounting plate 32. The first shaft section 48 of the drive shaft 41 is engageable with the further friction wheel 54 by means of the actuating spring 58 via the bearing support 40. If the actuating spring 58 bears against the support 40 with its first leg 60, this bearing support is pivoted towards the further friction wheel 54, the first shaft section 48 abutting against the further friction wheel 54, the first shaft section 48 abutting against the further friction wheel 54 and this wheel being also moved by the pivotal movement of the lever 56 until it engages with the friction wheel 36 which is rotationally interlocked with the forward-winding mandril 6. By an appropriate choice of its spring force the actuating spring 58 provides an accurately defined pressure, dictated by said spring force, between the first shaft section 58 and the further friction wheel 54 and between the further friction wheel 54 and the friction wheel 36 which is rotationally interlocked with the forward-winding mandril 6, which is advantageous both for a friction which is adequate to ensure a correct power transmission and for a long life of the friction-wheel transmission.

The second shaft section 49 of the drive shaft 41 carries a spur wheel 64 which, by means of the bearing support 40, is engageable with a drive mechanism 65 to drive the winding mandril wheel 37 which is rotationally interlocked with the reverse-winding mandril 7 and which is constructed as a worm wheel, the mechanism 65 comprising the drive transmission 52 which compensates for the difference between the level 51 of the second shaft section 41 and the level 38 of the winding mandril wheels 36 and 37. Thus, by means of the spur wheel 64 on the second shaft section 49 a shaft transmission 67 disposed at substantially the same level 38 as the winding mandril wheels 36 and 37 and comprising a flexible portion 66 can be driven via a first drive section of the mechanism 65 with which the spur wheel 64 on the drive shaft 41 is engageable by means of the bearing support 40 and which drive section constitutes the drive transmission 52 bridging the difference between the level 51 of the spur wheel 64 and the level 38 of the winding mandril wheels 36 and 37. The shaft transmission 67 drives the worm wheel 37, which is rotationally interlocked with the reverse-winding mandril 7, via a second drive section 68 of the drive mechanism 65, which second drive section is disposed at substantially the same level 38 as the winding mandril wheels 36 and 37.

Here the flexible portion 66 of the shaft transmission 67 is simply constituted by a helical spring of a customary standard type. One end of the helical spring 66 is rotationally interlocked with a first rigid shaft 69 driven by the first drive section 52 and its other end is rotationally interlocked with a second rigid shaft 70 driving the second drive section 68. Alternatively, the end turns of the helical spring may be fitted loosely onto the two rigid shafts and may comprise angular end portions which each extend in the same direction as the relevant shaft and which transmit the rotation by co-operation with a stop provided on the relevant shaft; the length of such a helical spring is less critical. The first shaft 69 is rotatably journalled by means of two stationary bearings 71 and 72 provided on the mounting plate 32. The second shaft 70 is rotatably journalled by means of two bearings 74 and 75 arranged on a further support 73 which is movable transversely of the spindles 34 and 35 of the winding mandrils 6 and 7. The support 73 is pivotable about a spindle 76 which is locked against rotation in the mounting plate 32, the second shaft 70 thus also being pivotable.

The first drive section 52 comprises a further spur wheel 78, with which the spur wheel 64 on the second shaft section 49 is engageable by means of the bearing support 40 and which is rotatable about a spindle 77 which is locked against rotation in the mounting plate 32, a crown wheel 79, which is coaxially connected to the first spur wheel 78 and whose teeth point towards the level 38 of the winding mandril wheels 36 and 37, and a pinion 80, which meshes with the crown wheel 79 and which is connected to the first shaft 69 of the shaft transmission 67. The further spur wheel 78 and the crown wheel 79 are simply integrally connected to one another.

The second drive section 68 comprises a multiple-thread worm, which is rotationally interlocked with the second shaft 70 of the shaft transmission 67 and which together with the second shaft 70 is rotatably journalled on the support 73 which is movable transversely of the spindles 34 and 35 of the winding mandrils 6 and 7, said worm being engageable with the worm wheel 37, which is rotationally interlocked with the reverse-winding mandril 7, by moving the support 73.

A further actuating spring 81 is arranged near the support 73 to urge the support 73 towards a stationary stop 82 on the mounting plate 32, which spring by means of the support 73 enables the worm 68 to be disengaged from the worm wheel 37, which is rotationally interlocked with the reverse-winding mandril 7. When the worm 68 is in mesh with the worm wheel 37 the support 73 abuts against a further stationary stop 83 on the mounting plate 32 to define the working depth between the teeth of the worm 68 and the worm wheel 37. The further actuating spring 81 is also constructed as a leg spring having two legs and whose wound central portion fits onto a stationary pin 84 on the mounting plate 32. The leg spring 81 comprises a first leg 85 which has two angular portions and which engages a slot 86 in the support 73 and thus acts on the support. A further leg 87 of the leg spring 81 acts on a movably guided cylindrical latching roller 88 which is guided transversely of the side wall 29 and parallel to the mounting plate 32 by means of two L-shaped guide members 89 and 90 which project from the mounting plate 32.

The drive mechanism 65 described above consitutes a robust, reliable and high-efficiency drive transmission between the drive shaft 41 and the worm wheel 37 which is rotationally interlocked with the reverse-winding mandril 7, ensuring a reliable drive of the magnetic tape 19 in the cassette 5 in the "fast reverse" mode. The further spur wheel 78, the crown wheel 79 which is integral with said wheel, and the pinion 80 which is in mesh with this crown wheel constitute a very simple, compact and cheap drive transmission 52 which compensates for the difference between the level 51 of the spur wheel 64 on the drive shaft 41 and the level 38 of the winding mandril wheels 36 and 37. The shaft transmission 67 with its flexible portion constituted by the helical spring 66 forms a very compact drive transmission, which is advantageous in order to minimise the dimensions of the apparatus. The worm drive comprising the multiple-thread worm 68 and the worm wheel 37 provides a very simple means of transmitting power from the second shaft 70 to the reverse-winding mandril 7, whose axes extend at right angles to one another. Such a worm drive is also advantageous for a compact construction.

In the present apparatus 1 the motor 43 and the further pulley 46 on its motor shaft 45 are arranged in such a way relative to the pulley 44 forming the drive wheel that via the pulley 44 the belt 47 exerts on the movable bearing support 40 a force which acts to bring the spur wheel 64 on the second shaft section 49 of the drive shaft 41 in mesh with the drive mechanism 65 to drive the worm wheel 37 which is rotationally interlocked with the reverse-winding mandril 7. In this way the spur wheel 64 can be brought in mesh with the further spur wheel 78 simply by the force exerted by the belt 47, so that separate actuating means for bringing these two spur wheels in mesh with each other can be dispensed with.

As already stated, the "fast forward", the "normal forward", "stop" and "fast reverse" modes can be selected by means of the slide button 11, which is movable to and fro in the longitudinal direction of the narrow side 3 of the apparatus. FIG. 3 shows the slide button 11 in the operating position corresponding to the "stop" mode. A projection 91 of the slide button 11, extends through an opening 93 formed in the side wall 29 and in the adjacent angular portion 92 of the mounting plate 32 and is connected to a control slide 94, shown only partly in FIG. 3, which is guided on the mounting plate 32 so as to be slidable in its longitudinal direction. The control slide 94 serves for controlling the movement of the support 73 for the second shaft 70 together with the worm 68 and the movement of the bearing support 40 for the drive shaft 41 together with the drive wheel 44. By means of the slide button 11 the control slide 94 is movable by hand between a fast-forward position, a normal-forward position, a stop position, and a reverse position. The control slide 94 can actuate a brake for the friction wheel 36 which is rotationally interlocked with the forward-winding mandril 6 and an electrical switching device, for connecting the motor 43 to at least one voltage supply and for controlling further electrical devices, for example a recording and playback amplifier but this is not shown in FIG. 3 for the sake of simplicity and because it is not relevant to the present invention.

The control slide 94 has two channel-shaped latching recesses 95 and 96, of which the latching recess 95 corresponds to the stop mode and the latching recess 96 corresponds to the forward mode. Depending on the operating position of the control slide 94 the second limb 87 of the further actuating spring 81 urges the latching roller 88 into said latching recess 95 or 96. Thus, the actuating spring 81 for the support 73 also performs the additional function of latching spring for loading the latching roller 88. By means of the latching roller 88 the control slide 94 is latched in the two said operating positions. When the control slide 94 is moved out of the stop position shown in FIG. 3 in the direction indicated by the arrow 97 until the projection 91 of the slide button 11 abuts against the bounding wall 98 of the opening 93 the control slide will assume its reverse operating position, in which it is not latched. During this movement a return spring, not shown, is tensioned and after release of the slide button 11 from its reverse operating position the spring returns the control slide 94 to its stop position, in which it is latched. When the control slide 94 is moved from the stop position shown in FIG. 3 in the direction of the arrow 99 via the forward operating position until the projection 91 of the control button 11 abuts against the bounding wall 100 of the opening 93 the control slide 94 will assume its fast-forward operating position, in which it is not latched either. During a movement of the control slide 94 to its fast-forward operating position a return spring, not shown, is also tensioned and after release of the slide button 11 from its fast-forward operating position this spring returns the control slide to its forward operating position, in which it is latched.

For controlling the movement of the bearing support 40 the control slide 94 comprises a first actuating portion constituted by a stepped portion 101 and for controlling the movement of the support 73 it comprises a second actuating portion constituted by a projection 102. In the reverse operating position the stepped portion 101 of the control slide 94 keeps the first leg 60 of the actuting spring 58, which leg can load the bearing support 40 in a position in which no load is exerted on the bearing support 40. Moreover, in the reverse operating position the projection 102 of the control slide 94 keeps the first leg 85 of the further actuating spring 81, which leg acts on the support 73, in a position in which the worm 68 is in mesh with the worm wheel 36, which is rotationally interlocked with the reverse-winding mandril 7. In the forward operating position of the control slide 94, the stepped portion 101 and the projection 102 of this slide are clear of the two actuating springs 58 and 81, the stepped portion 101 being lifted off the first leg 60 of the actuating spring 58 and the projection 102 being lifted off the first leg 85 of the further actuating spring 81.

Figure 3:
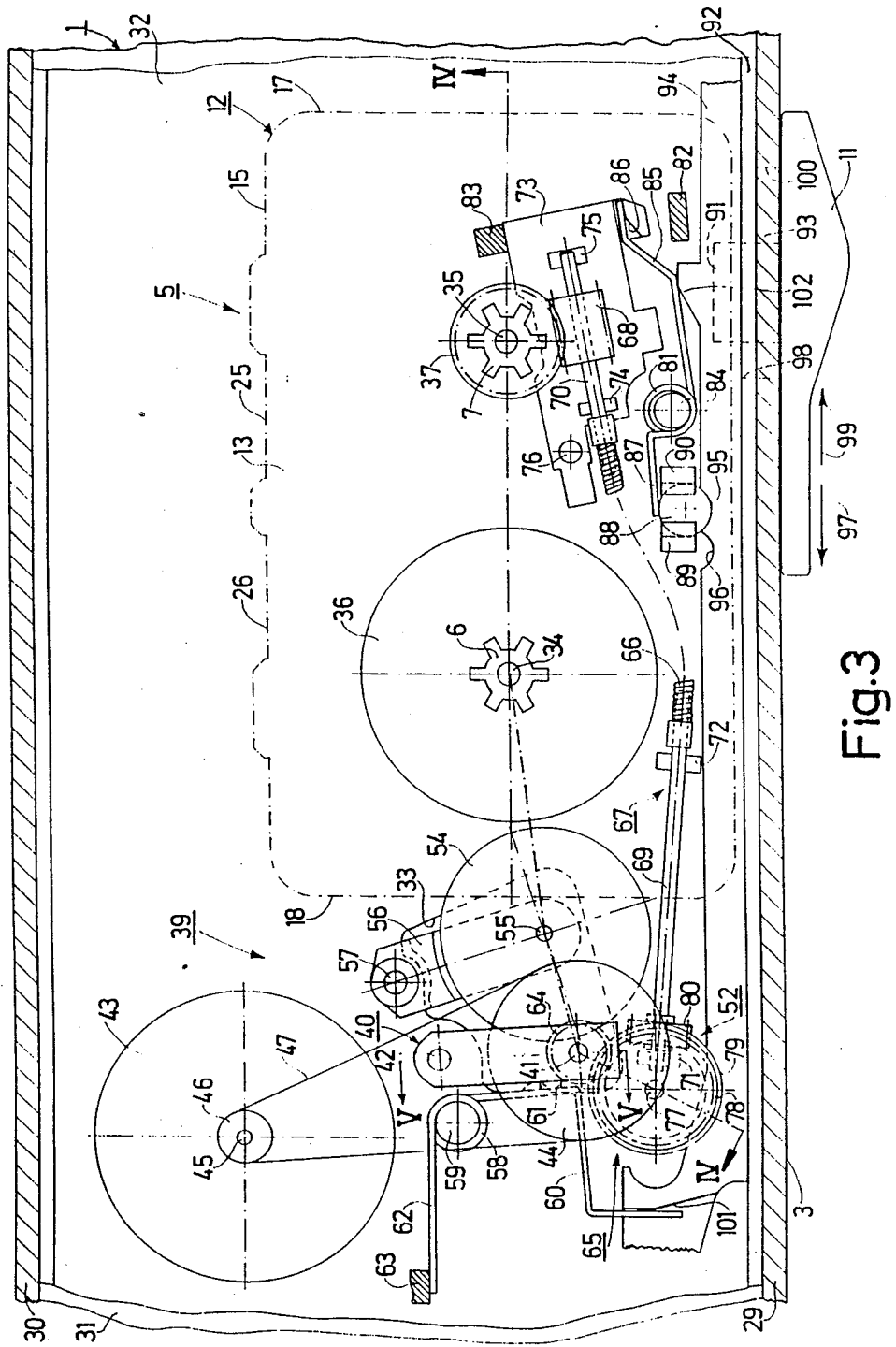
FIG. 3 shows a slightly simplified plan view of a part of the apparatus in FIG. 1 to a slightly enlarged scale relative to FIGS. 1 and 2 and with the upper part of the apparatus cut away, the shown part of the apparatus comprising a drive arrangement for two winding mandrils of the apparatus and the cassette being shown in dash-dot lines.

FIG. 3 shows the control slide 94 in its stop position, in which the latching roller 88 is urged into the latching recess 95. As a result of the force exerted by the belt 47 the spur wheel 64 on the drive shaft 41 is then already in mesh with the further spur wheel 78 of the drive mechanism 65 and the worm 68 is in mesh with the worm wheel 37 because the first leg 85 of the further actuating spring 81 keeps the support 73 in the position in which said support 73 abuts against the further stationary stop 83. However, in this top position the motor 43 of the aparatus 1 receives no supply voltage so that the motor does not run and consequently the magnetic tape 19 in the cassette 5 is not driven.

When the slide button 11 is actuated by hand to move the control slide 94 from its stop position shown in FIG. 3 into its reverse operating position in the direction indicated by the arrow 97, the return spring, not shown, is tensioned and via the stepped portion 101 the first limb 60 of the actuating spring 58 is lifted off the projection 61 of the bearing support 40 and the belt 47 keeps the spur wheel 64 on the drive shaft 41 in mesh with the further spur wheel 78, so that the drive transmission between the drive shaft 41 and the friction wheel 36, which is rotationally interlocked with the forward winding mandril 5, is disengaged and consequently does not form a load when the magnetic tape 19 is driven in the "fast reverse" mode, the magnetic tape 19 then being pulled off the reel hub which co-operates with the forward-winding mandril 6. Moreover, by means of the projection 102, the first leg 85 of the further actuating spring 81 and the support 73 the worm 68 is kept in mesh with the worm wheel 37. Further, the brake for the friction wheel 36 is lifted by means of the control slide 94 and the motor 43 is connected to a high first voltage, such that the motor 43 is driven anti-clockwise with a higher speed, as is illustrated in FIG. 3. By means of the further pulley 46, the belt 47, the drive wheel 44, the drive shaft 41, the spur wheel 64, and the drive mechanism 65 the motor 43 then drives the reverse-winding mandril 7, as is illustrated in FIG. 3, in a clockwise direction with a high speed, the magnetic tape 19 in the cassette 5 being driven with a high speed of transport in the "fast reverse" mode and being wound onto the reel hub which is coupled to the reverse-winding mandril 7. In the present apparatus the speed of the magnetic tape in the "fast reverse" mode is approximately seven times as high as in the "normal forward" mode. After release of the slide button 11 the return spring automatically returns the non-latched control slide 94 to its stop position, so that the magnetic tape 19 is no longer driven.

When by means of the slide button 11 the control slide 94 is set by hand from the stop position shown in FIG. 3 into its forward position in the direction indicated by the arrow 99, in which the latching roller 88 engages the latching recess 96 to keep the control slide 94 in a latched position, the stepped portion 101 is lifted off the first leg 60 of the actuating spring 58 and the projection 102 is lifted off the first leg 85 of the further actuating spring 81, so that the control slide 94 is liberated by the two actuating springs 58 and 81. The first leg 60 of the actuating spring 58 then acts against the projection 81 of the bearing support 40, causing the bearing support 40 to be pivoted towards the further friction wheel 54. The first shaft section 48 of the drive shaft 41 then abuts against the further friction wheel 54 and consequently pivots the further friction wheel 54 so far that it engages against the friction wheel 36, which is rotationally interlocked with the forward winding mandril 6. In this way drive is transmitted between the drive shaft 41 and the friction wheel 36. Since the projection 102 is clear of the first leg 85 of the further actuating spring 81 the first leg 85 of the further actuating spring 81 can pivot the support 73 towards the stationary stop 82 until the support 73 abuts against this stop 82, so that the worm 88 is disengaged from the worm wheel 37 and thus does not impede the drive of the magnetic tape 19 in the "normal forward" mode, in which the magnetic tape 19 is unwound from the reel hub which cooperates with the reverse-winding mandril 7. During its movement to the forward operating position the control slide 94 lifts the brake for the friction wheel 37 and connects the motor 43 to a low second voltage, causing the motor 43, as shown in FIG. 3, to be driven anti-clockwise but with a lower speed. The motor 43 then drives the forward-winding mandril 6, as shown in FIG. 3, anti-clockwise with a low speed via the further pulley 46, the belt 47, the drive wheel 44, the drive shaft 41, the further friction wheel 54, and the friction wheel 36, causing the magnetic tape 19 in the cassette 5 to be driven with a lower speed of transport in the "normal forward" mode and to be wound onto the reel hub which cooperates with the forward-winding mandril 6.

If by means of the slide button 11 the control slide is set from its forward operating position to its stop position the first shaft section 48 of the drive shaft 41 is lifted off the further friction wheel 54 and the spur wheel 64 on the drive shaft 41 meshes again with the further spur wheel 78 of the drive mechanism 65 and the worm 68 again meshes with the worm wheel 37, the motor 43, which has already been switched off but which is still running out, briefly driving the reverse-winding mandril 7 in the clockwise direction shown in FIG. 3. In this way the magnetic tape 19 is automatically rewound over a short length, so that when the "normal forward"

mode is switched off the dictated passage opposite the magnetic recording and playback head of the apparatus is moved back over a short length relative to said magnetic head and can consequently be reproduced when again "normal forward" transport is selected in the playback mode. During dictation this enables the end of the dictation after every interruption to be reproduced and monitored automatically before dictation is continued.

If by means of the slide button 11 the control slide 94 is moved by hand from the forward operating position just described into its fast-forward operating position against the force of the return spring, not shown, in the direction indicated by the arrow 99, the mechanical situation will not change in comparison with the situation in the "normal forward" mode described above. However, as the actuating slide 94 is set to its fast-forward operating position this slide connects the motor 43 to the first voltage, which is higher than the low second voltage in the "normal forward" mode, causing the motor 43 to be driven anti-clockwise with a higher speed. The motor 43 then drives the forward winding mandril 6 via the drive transmission described above with a higher speed than in the "normal forward" mode, the magnetic tape 19 in the cassette 5 being driven with a higher speed of transport in the "fast forward" mode than in the "normal forward" mode and being wound onto the reel hub which is coupled to the forward-winding mandril 6. In the present apparatus the transport speed of the magnetic tape in the "fast forward" mode is approximately twice that in the "normal forward" mode. After release of the slide button 11 the non-latched actuating slide 94 is automatically set to its forward operating position by the return spring, in which position it is latched by the latching roller 88 which engages its latching recess 96. Thus, immediately after the "fast forward" mode is switched off the apparatus is set to the "normal forward" mode, which is advantageous for locating a passage of a dictation already recorded.

As will be apparent from the foregoing description all the control functions for the apparatus parts involved in driving the two winding mandrils 6 and 7 are performed by means of only one control slide 94, which is advantageous for a simple construction and accurately coordinated cycles of movement.

The bearing support 40 of the apparatus 1 shown in FIG. 1 is shown in detail in FIG. 5. The bearing support 40 comprises a sleeve portion 103 which surrounds the shaft 42. A first arm 104 and a second arm 106, both comprising two angular portions, project from the sleeve portion 103, one end of the drive shaft 41 being journalled in and a disc 105 supporting the drive shaft 41 being secured to said first arm and the other end of the drive shaft 41 being journalled in and a blade spring 107, which urges the drive shaft 41 against the bearing disc 105, being secured to said second arm which is remote from the mounting plate 32. As is evident from FIG. 5, the arm portion of the first arm 104 carrying the bearing plate 105 is disposed at the same level as the mounting plate 32, said arm portion of the arm 104 being situated in the opening 33 in the mounting plate 32.

FIG. 6 shows a bearing support 40 of a further apparatus. In this apparatus the bottom wall 31 directly adjoins the mounting plate 32, so that here the thickness of the apparatus is in fact dictated only by the overall height required for accommodating the cassette and the winding mandril wheels and is consequently minimal, resulting in a very flat apparatus. In the bearing support 40 of this apparatus the two arms 104 and 106 which project from the sleeve portion 103 each comprise only one angular portion. Further, this bearing support 40 has a first arm 104 which is connected to the sleeve portion 103 and whose arm portion which directly adjoins the sleeve portion 103 is situated at a level between the level 38 of the first shaft section 48 which functions as a friction wheel and the level 51 of the second shaft section 49 carrying the spur wheel 64, and the bearing disc 105, which is secured to the arm 104 and which supports the drive shaft 41, is of an angular construction, the disc portion supporting the drive shaft 41 being arranged just below the level 38 of the first shaft section 48. In this way it is achieved that the bearing support 40 requires a very small amount of space in the axial direction of the drive shaft 41 and does not extend beyond the level of the mounting plate 32. Therefore, the mounting plate 32 need not be formed with an opening for the passage of this bearing support 40.

Figure 7:
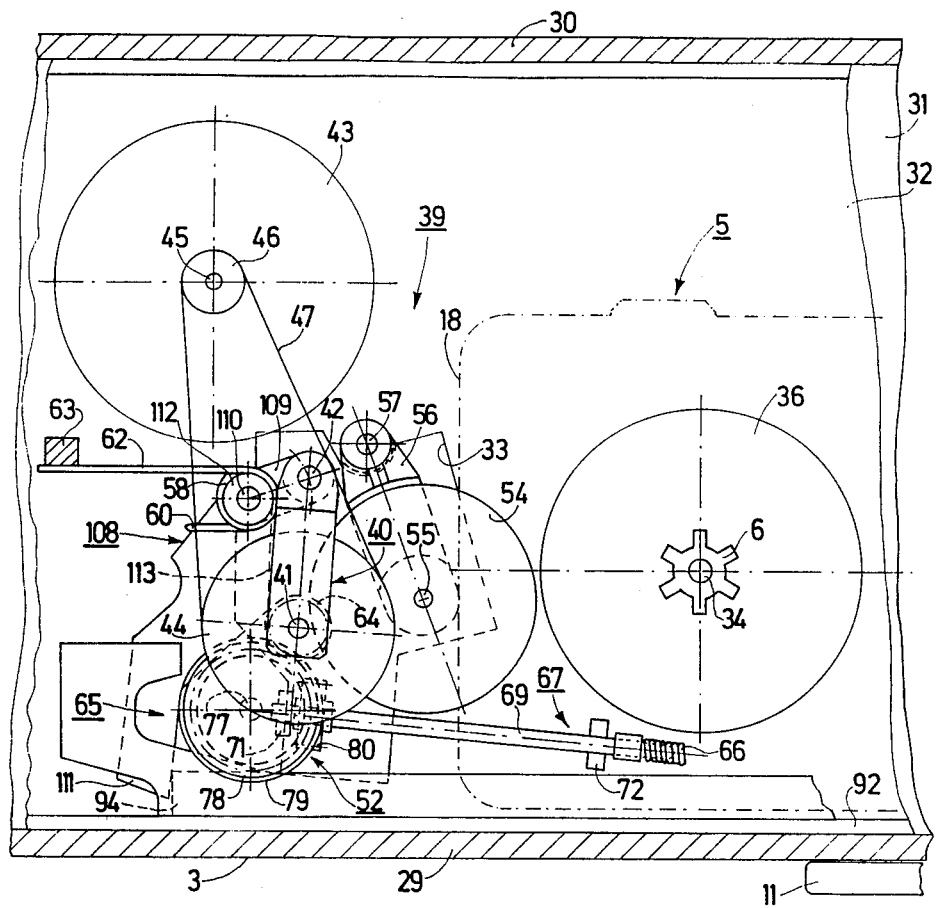
FIG. 7, similarly to FIG. 3, shows a bearing support arranged on movable lever for rotatably supporting a drive wheel of a drive arrangement for the winding mandrils of an apparatus in a third embodiment of the invention.

FIG. 7 shows a part of a further apparatus in which for moving the bearing support 40 this support is arranged on a pivotable actuating lever 108 and the spindle 42 about which the bearing support 40 is pivotable is fixedly secured to a first arm 109 of the actuating lever 108. The actuating lever 108 is pivotable about a spindle 110 which is locked against rotation in the mounting plate 32. The actuating spring 58 for the bearing support 40 acts against a second arm 111 of the actuating lever 108 with its first leg 60, its second leg 62 acting against the stationary stop 63. The wound central portion of the actuating spring 58 is now mounted on a cylindrical portion of the actuating level 108, which portion is coaxial with the spindle 110. The actuating lever 108 comprises a projection 113 against which the bearing support 40 can abut under the influence of the force exerted by the belt 47 and via which the actuating lever 108 can move the bearing support 40 under the influence of the actuating spring 58. The free end of the second arm 111 of the actuating lever 108 extends into the area of the control slide 94, so that the control slide can control the movement of the actuating lever 108 and hence that of the bearing support 40 via the second arm 111.

The arrangement of the bearing support 40 on the actuating lever 108 and the arrangement of the spindle 110 of the actuating lever 108 in the apparatus are selected in such a way that when the bearing support 40 is moved to mesh the spur wheel 64 on the second shaft section of the drive shaft 41 with the further spur wheel 78 of the drive mechanism 65, in order to drive the toothed wheel which is rotationally interlocked with the reverse-winding mandril, the pulley 44, which serves as the drive wheel, is moved away from the further pulley 46 on the motor shaft 45 of the motor 43, causing the belt 47 between the further pulley 46 and the pulley 44 to be tensioned additionally. This additional tensioning of the belt 47 results in a higher friction in the "fast reverse" mode than in the "normal forward" mode, which has the advantage of a reliable drive of the magnetic tape, even in the case of cassettes which do not operate smoothly, in the "fast reverse" mode and an energy-saving drive of the magnetic tape in the "normal forward" mode. Such an energy-saving drive in the "normal forward" mode has the advantage of extending the life of the batteries powering the motor.

The invention is not limited to the embodiments described in the foregoing. For example, the drive wheel on the drive shaft may also be constructed as a friction wheel and can be driven by the motor via a friction-wheel drive. The first shaft section of the drive shaft may be provided with a friction wheel which has a larger diameter than the drive shaft and which is engageable with the further friction wheel to drive the friction wheel which is rotationally interlocked with the forward-winding mandril. Moreover, the first shaft section may carry a pulley by means of which a winding mandril wheel constructed as a pulley and rotationally interlocked with the forward-winding mandril can be driven via a belt drive. When a spur wheel is mounted on the second shaft section the reverse-winding mandril can also be driven by means of a gear drive comprising only spur wheels and constructed to bridge the difference between the level of the spur wheel on the drive shaft and the level of the winding mandril wheels, comprising at least two coaxial spur wheels for this purpose. Alternatively, the second shaft section may carry a friction wheel by which the winding mandril wheel which is rotationally interlocked with the forward-winding mandril, which is constructed as a friction wheel, can be driven via a friction-wheel drive constructed to bridge the difference between the level of said friction wheel and the level of the winding mandril wheels. Alternatively, the first shaft section may carry a spur wheel by which the reverse-winding mandril can be driven via a gear drive comprising only spur wheels. Moreover, for a compact drive construction for the reverse-winding mandril a belt drive may be provided which can be driven by one of the two shaft sections by moving the bearing support. In the first and the third embodiment of the apparatus the motors extend beyond the cassettes in their width direction. However, such a motor as well as the drive wheel can be arranged in an apparatus within the width dimension of a cassette in which case the width of the apparatus is, in principle, dictated only by the cassette width and can be very small.

We claim:

1. A recording and/or reproducing apparatus (1) for a record carrier (19) in the form of a tape accommodated in a cassette (5) which can be loaded into the apparatus (1) and which comprises two juxtaposed rotatable reel hubs (20, 21) for taking up the record carrier (19), the apparatus comprising a rotatable forward winding mandril (6) and a rotatable reverse winding mandril (7), which winding mandrils each engage one of the two reel hubs (20, 21) respectively to drive the record carrier (19) when a cassette (5) is present in the apparatus (1) and are each rotationally interlocked with one of two winding mandril wheels (36, 37) which are coaxial with the two winding mandrils (6, 7) and which are both arranged at substantially the same axial level (38) adjacent a cassette main side (14) which faces the winding mandril wheels (36, 37) and comprising a drive arrangement (39) which is constructed to drive the two winding mandril wheels (36, 37) and which comprises a drive shaft (41) which extends parallel to the axes (34, 35) of the winding mandrils (6, 7) and which is rotatably journalled on a bearing support (40) which is movable transversely of the axes (34, 35) of the winding mandrils (6, 7), which drive shaft carries a drive wheel (44) which is rotatable by a motor (43), and which comprises a first shaft section (48) and a second shaft section (49), the first shaft portion (48) being disposed at substantially the same level (38) as the winding mandril wheels (36, 37) and the second shaft section (49) being disposed at a level (51) between the level (38) of the winding mandril wheels (36, 37) and the level (50) of the cassette main-side (13) which is remote from the winding mandril wheels (36, 37), and by means of which the second shaft section one of the two winding mandril wheels (36, 37) is selectively drivable by moving the bearing support (40), a drive transmission (52) being arranged between the second shaft section (49) and the winding mandril wheel (37) which can be driven by means of said shaft section, to bridge the difference between their levels (51, 38), characterized in that the drive wheel (44) on the drive shaft (41) is also disposed at a level (53) between the level (38) of the winding mandril wheels (36, 37) and the level (50) of the cassette main side (13) which is remote from the winding mandril wheels (36, 37).

2. An apparatus as claimed in claim 1, characterized in that the level (53) of the drive wheel (44) on the drive shaft (41), viewed in the axial direction of the drive shaft (41), is situated at a larger distance from the level (38) of the winding mandril wheels (36, 37) than the level (51) of the second shaft section (49) of the drive shaft (41).

3. An apparatus as claimed in claim 1, characterized in that the drive wheel is situated adjacent the cassette in the proximity of one of the two short and narrow cassette sides.

4. An apparatus as claimed in claim 2, characterized in that the drive wheel (44) is situated adjacent the cassette (5) in the proximity of one of the two short and narrow cassette sides (17, 18).

5. An apparatus as claimed in claim 4, characterized in that the drive wheel (44) is situated adjacent the cassette in the proximity of the short and narrow cassette side (18) nearest the forward winding mandril (6).

6. An apparatus as claimed in claim 5, in which the winding mandril wheel which is rotationally interlocked with the reverse winding mandril is constructed as a toothed wheel and in which the second shaft section of the drive shaft carries a spur wheel which by moving the bearing support is engageable with a drive mechanism, via which the toothed wheel which is rotationally interlocked with the reverse winding mandril can be driven, the drive mechanism comprising a drive transmission which bridges the difference between the level of the second shaft section and the level of the winding mandril wheels, characterized in that via a first drive section of the drive mechanism, with which section the spur wheel is engageable by moving the bearing support and which constitutes the drive transmission which bridges the difference between the level of the spur wheel and the level of the winding mandril wheels, the spur wheel on the second shaft section is arranged to drive a shaft transmission comprising a flexible portion and disposed at substantially the same level as the winding mandril wheels which shaft transmission, via a second drive section of the drive mechanism, which drive section is disposed at substantially the same level as the winding mandril wheels, drives the toothed wheel which is rotationally interlocked with the reverse winding mandril.

7. An apparatus as claimed in claim 5, in which the winding mandril wheel (36) with which the forward winding mandril (6) is rotationally interlocked is constructed as a friction wheel and can be driven by the first shaft section (48) of the drive shaft (41), characterized in that the friction wheel (36) which is rotationally interlocked with the forward-winding-mandril (6) is arranged to be driven via a further friction wheel (54) with which the first shaft section (48) of the drive shaft (41) is engageable by moving the bearing support (40).

8. An apparatus as claimed in claim 7, in which the winding mandril wheel which is rotationally interlocked with the reverse winding mandril is constructed as a toothed wheel and in which the second shaft section of the drive shaft carries a spur wheel which by moving the bearing support is engageable with a drive mechanism, via which the toothed wheel which is rotationally interlocked with the reverse winding mandril can be driven, the drive mechanism comprising a drive transmission which bridges the difference between the level of the second shaft section and the level of the winding mandril wheels, characterized in that via a first drive section of the drive mechanism, with which section the spur wheel is engageable by moving the bearing support and which constitutes the drive transmission which bridges the difference between the level of the spur wheel and the level of the winding mandril wheels, the spur wheel on the second shaft section is arranged to drive a shaft transmission comprising a flexible portion and disposed at substantially the same level as the winding mandril wheels which shaft transmission, via a second drive section of the drive mechanism, which drive section is disposed at substantially the same level as the winding mandril wheels, drives the toothed wheel which is rotationally interlocked with the reverse winding mandril.

9. An apparatus as claimed in claim 7, characterized in that an actuating spring (58) for moving the bearing support (40) is arranged, in the proximity of said support to load the bearing support (40) for movement towards the further friction wheel (54) and by means of which spring, via the bearing support (40), the first shaft section (48) of the drive shaft (41) is engageable with the further friction wheel (54) to drive said further friction wheel (FIGS. 3; 7).

10. An apparatus as claimed in claim 9, characterized in that in its reverse operating position the control slide, via a first actuating portion of said slide keeps the actuating spring provided for loading the bearing support in a position in which the bearing support is not loaded, and via a second actuating portion of said slide, keeps the further actuating spring provided for loading the further support in a position in which the worm is in mesh with the worm wheel, and in its forward operating position its first actuating portion and the second actuating portion are clear to the two actuating springs.

11. An apparatus as claimed in claim 9, in which the winding mandril wheel (37) which is rotationally interlocked with the reverse winding mandril (7) is constructed as a toothed wheel and in which the second shaft section (49) of the drive shaft (41) carries a spur wheel which by moving the bearing support (40) is engageable with a drive mechanism (65), via which the toothed winding mandril wheel (37) which is rotationally interlocked with the reverse winding mandril (7) can be driven, the drive mechanism (65) comprising a drive transmission (52) which bridges the difference between the level (51) of the second shaft section (49) and the level (38) of the winding mandril wheels (36, 37), characterized in that via a first drive section (52) of the drive mechanism (65), with which section the spur wheel (64) is engageable by moving the bearing support (40) and which constitutes the drive transmission which bridges the difference between the level (51) of the spur wheel (64) and the level (38) of the winding mandril wheels (36, 37), the spur wheel (64) on the second shaft section (49) is arranged to drive a shaft transmission (67) comprising a flexible portion (66) and disposed at substantially the same level (38) as the winding mandril wheels (36, 37) which shaft transmission, via a second drive section (68) of the drive mechanism (65), which drive section is disposed at substantially the same level (38) as the winding mandril wheels (36, 37), drives the toothed wheel (37) which is rotationally interlocked with the reverse winding mandril (7).

12. An apparatus as claimed in claim 11, characterized in that the first drive section comprises a further spur wheel, which is engageable with the spur wheel on the second shaft section by moving the bearing support, a crown wheel, which is coaxially connected to the further spur wheel and whose teeth point towards the level of the winding mandril wheels, and a pinion, which meshes with the crown wheel, and which is connected to the first shaft of the shaft transmission.

13. An apparatus as claimed in claim 11, characterized in that the flexible portion (66) of the shaft transmission (67) is constituted by a helical spring having one of its ends attached to a first shaft (69) driven by the first drive section and having its other end attached to a second shaft (70) driving the second drive section (68).

14. An apparatus as claimed in claim 13, characterized in that the toothed wheel which is rotationally interlocked with the reverse winding mandril is constructed as a worm wheel and in that the second drive section is constituted by a worm connected to the second shaft of the shaft transmission which worm together with the second shaft is rotatably supported by a further support which is movable transversely of the axes of the winding mandrils and which worm is engageable with the worm wheel by moving the further support.

15. An apparatus as claimed in claim 13, characterized in that the toothed wheel which is rotationally interlocked with the reverse winding mandril is constructed as a worm wheel and in that the second drive section is constituted by a worm connected to the second shaft of the shaft transmission which worm together with the second shaft is rotatably supported by a further support which is movable transversely of the axes of the winding mandrils and which worm is engageable with the worm wheel by moving the further support.

16. An apparatus as claimed in claim 13, characterized in that the first drive section (52) comprises a further spur wheel (78), which is engageable with the spur wheel (64) on the second shaft section (49) by moving the bearing support (40), a crown wheel (79), which is coaxially connected to the further spur wheel (78) and whose teeth point towards the level (38) of the winding mandril wheels (36, 37), and a pinion (80), which meshes with the crown wheel (79), and which is connected to the first shaft (69) of the shaft transmission (67).

17. An apparatus as claimed in claim 16, characterized in that the toothed wheel (37) which is rotationally interlocked with the reverse winding mandril (7) is constructed as a worm wheel and in that the second drive section (68) is constituted by a worm connected to the second shaft (70) of the shaft transmission (67) which worm together with the second shaft (70) is rotatably supported by a further support (73) which is movable transversely of the axes (34, 35) of the winding mandrils (6, 7) and which worm is engageable with the worm wheel (37) by moving the further support (73).

18. An apparatus as claimed in claim 17, characterized in that for controlling the movement of the support for the second shaft together with the worm and the movement of the bearing support for the drive shaft together with the drive wheel there is provided a single control slide which is movable by hand between at least a forward operating position and a reverse operating position.

19. An apparatus as claimed in claim 17, characterized in that a further actuating spring (81) for moving the further support is arranged in the proximity of the further support (73) to load the further support (73) for movement towards a stationary stop (82) for said further support and by means of which spring, via the further support (73), the worm (68) is disengageable from the worm wheel (37) which is rotationally interlocked with the reverse-winding mandril (7).

20. An apparatus as claimed in claim 19, characterized in that the further actuating spring is constructed as a leg spring of which one leg acts against the further support and whose other leg acts against a latching member which is guided to be movable transversely of the direction of movement of the control slide and which under the influence of the further actuating spring, at least in one of the operating positions of the control slide, engages in a latching recess formed in the control slide and corresponding to said operating positions.

21. An apparatus as claimed in claim 19, characterized in that in its reverse operating position the control slide, via a first actuating portion of said slide keeps the actuating spring provided for loading the bearing support in a position in which the bearing support is not loaded, and via a second actuating portion of said slide, keeps the further actuating spring provided for loading the further support in a position in which the worm is in mesh with the worm wheel, and in its forward operating position its first actuating portion and the second actuating portion are clear to the two actuating springs.

22. An apparatus as claimed in claim 19, characterized in that for controlling the movement of the support (73) for the second shaft (70) together with the worm (68) and the movement of the bearing support (40) for the drive shaft (41) together with the drive wheel (44) there is provided a single control slide (94) which is movable by hand between at least a forward operating position and a reverse operating position.

23. An apparatus as claimed in claim 22, characterized in that in its reverse operating position the control slide, via a first actuating portion of said slide keeps the actuating spring provided for loading the bearing support in a position in which the bearing support is not loaded, and via a second actuating portion of said slide, keeps the further actuating spring provided for loading the further support in a position in which the worm is in mesh with the worm wheel, and in its forward operating position its first actuating portion and the second actuating portion are clear to the two actuating springs.

24. An apparatus as claimed in claims 22, characterized in that the further actuating spring (81) is constructed as a leg spring of which one leg (85) acts against the further support (73) and whose other leg (87) acts against a latching member (88) which is guided to be movable transversely of the direction of movement of the control slide (94) and which under the influence of the further actuating spring (81), at least in one of the operating positions of the control slide (94), engages in a latching recess (95, 96) formed in the control slide (94) and corresponding to said operating position.

25. An apparatus as claimed in claim 24, in which the drive wheel on the drive shaft is constructed as a pulley and in which a further pulley is mounted on the motor shaft of the motor to drive the pulley via a belt, characterized in that the belt exerts a force on the movable bearing support via the pulley to cause the bearing support to bring the spur wheel on the second shaft section of the drive shaft in mesh with the drive mechanism for driving the toothed wheel which is rotationally interlocked with the reverse-winding mandril.

26. An apparatus as claimed in claim 25, characterized in that for moving the bearing support said support is arranged on a pivotable actuating lever and in that during the movement of the bearing support to bring the spur wheel on the second shaft section of the drive shaft in mesh with the drive mechanism for driving the toothed wheel which is rotationally interlocked with the reverse-winding mandril the pulley is moved away from the further pulley, causing the belt between the further pulley and the pulley to be tensioned additionally.

27. An apparatus as claimed in claim 24, characterized in that in its reverse operating position the control slide (94), via a first actuating portion (101) of said slide keeps the actuating spring (58) provided for loading the bearing support (40) in a position in which the bearing support (40) is not loaded, and via a second actuating portion (102) of said slide, keeps the further actuating spring (81) provided for loading the further support (73) in a position in which the worm (68) is in mesh with the worm wheel (37), and in its forward operating position its first actuating portion (101) and the second actuating portion (102) are clear to the two actuating springs (58, 85).

28. An apparatus as claimed in claim 27, in which the drive wheel (44) on the drive shaft (41) is constructed as a pulley and in which a further pulley (46) is mounted on the motor shaft (45) of the motor (43) to drive the pulley (44) via a belt (47), characterized in that the belt (47) exerts a force on the movable bearing support (40) via the pulley (44) to cause the bearing support (40) to bring the spur wheel (64) on the second shaft section (49) of the drive shaft (41) in mesh with the drive mechanism (65) for driving the toothed wheel (37) which is rotationally interlocked with the reverse-winding mandril (7).

29. An apparatus as claimed in claim 28, characterized in that for moving the bearing support (40) said support is arranged on an pivotable actuating lever (108) and in that during the movement of the bearing support (40) to bring the spur wheel (64) on the second shaft section (49) of the drive shaft (41) in mesh with the drive mechanism (65) for driving the toothed wheel (37) which is rotationally interlocked with the reverse-winding mandril (7) the pulley (44) is moved away from the further pulley (46), causing the belt (47) between the further pulley (46) and the pulley (44) to be tensioned additionally.

* * * * *